United States Patent
Mochizuki et al.

(10) Patent No.: US 10,668,704 B2
(45) Date of Patent: *Jun. 2, 2020

(54) ADHESIVE SHEET FOR SEALING METAL TERMINALS OF FLAT ELECTROCHEMICAL CELL

(71) Applicant: DAI NIPPON PRINTING CO., LTD., Tokyo (JP)

(72) Inventors: Youichi Mochizuki, Kyoto (JP); Masataka Okushita, Kyoto (JP); Hirohisa Akita, Kyoto (JP); Sumito Nishida, Kyoto (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/174,605

(22) Filed: Oct. 30, 2018

(65) Prior Publication Data

US 2019/0061327 A1 Feb. 28, 2019

Related U.S. Application Data

(63) Continuation of application No. 11/858,328, filed on Sep. 20, 2007, now Pat. No. 10,144,202.

(30) Foreign Application Priority Data

Sep. 21, 2006 (JP) ................. 2006-255618
Sep. 14, 2007 (JP) ................. 2007-239258

(51) Int. Cl.
| | | |
|---|---|---|
| *B32B 27/12* | (2006.01) | |
| *B32B 15/08* | (2006.01) | |
| *B32B 15/20* | (2006.01) | |
| *C08L 51/06* | (2006.01) | |
| *C09J 7/30* | (2018.01) | |
| *C09J 7/21* | (2018.01) | |
| *C09J 123/10* | (2006.01) | |
| *C09J 151/06* | (2006.01) | |
| *H01M 2/06* | (2006.01) | |
| *H01M 2/08* | (2006.01) | |
| *H01M 2/02* | (2006.01) | |

(52) U.S. Cl.
CPC ............. *B32B 27/12* (2013.01); *B32B 15/08* (2013.01); *B32B 15/20* (2013.01); *C08L 51/06* (2013.01); *C09J 7/21* (2018.01); *C09J 7/30* (2018.01); *C09J 123/10* (2013.01); *C09J 151/06* (2013.01); *H01M 2/021* (2013.01); *H01M 2/0212* (2013.01); *H01M 2/06* (2013.01); *H01M 2/08* (2013.01); *C08L 2666/02* (2013.01); *C09J 2205/114* (2013.01); *C09J 2400/263* (2013.01); *C09J 2423/00* (2013.01); *C09J 2451/00* (2013.01); *C09J 2467/006* (2013.01); *H01M 2/0287* (2013.01); *Y10T 428/249983* (2015.04); *Y10T 428/2878* (2015.01)

(58) Field of Classification Search
None
See application file for complete search history.

(56) References Cited

U.S. PATENT DOCUMENTS

| | | |
|---|---|---|
| 5,134,046 A | 7/1992 | Chow et al. |
| 6,242,131 B1 | 6/2001 | Noh |
| 6,316,140 B1 | 11/2001 | Hatazawa et al. |
| 6,905,798 B2 | 6/2005 | Tsukuda et al. |
| 2004/0029001 A1 | 2/2004 | Yamazaki et al. |
| 2004/0121231 A1 | 6/2004 | Kim |
| 2005/0014069 A1 | 1/2005 | Fukushima et al. |
| 2005/0117277 A1* | 6/2005 | Norton ............... H01G 9/02 361/512 |
| 2006/0046137 A1 | 3/2006 | Kodama |
| 2006/0073306 A1* | 4/2006 | Nakane ............... C08L 77/12 428/100 |
| 2006/0093908 A1 | 5/2006 | Hwang et al. |
| 2006/0216586 A1 | 9/2006 | Tucholski |
| 2007/0128513 A1 | 6/2007 | Hatta et al. |
| 2007/0207379 A1 | 9/2007 | Hatta et al. |

(Continued)

FOREIGN PATENT DOCUMENTS

| | | |
|---|---|---|
| JP | 62-061268 A | 3/1987 |
| JP | 2000-208112 A | 7/2002 |

(Continued)

OTHER PUBLICATIONS

Japanese Office Action dated Sep. 4, 2012, corresponding with Japanese Patent Application No. 2007-239258.

*Primary Examiner* — Sheeba Ahmed
(74) *Attorney, Agent, or Firm* — Fitch, Even, Tabin & Flannery, LLP

(57) ABSTRACT

In a packaging body provided with at least an inner layer composed of a thermal-adhesive polyolefin based resin and a barrier layer composed of a metal foil, in which metal terminals are sealed by the thermal-adhesive resin with unconnected ends of the metal terminals protruding outside, an adhesive sheet for sealing metal terminals of a flat electrochemical cell which is not only able to prevent a short circuit between the barrier layer and the metal terminals but high in a layer-to-layer adhesive strength and a low possibility of a reduction in battery performance to be caused due to invasion of moisture is provided. In the adhesive sheet for sealing a metal terminal part of a flat electrochemical cell according to the invention, a fibrous sheet or a porous sheet is covered by the inner layer and an acid-modified polyolefin based resin layer having adhesive properties.

19 Claims, 4 Drawing Sheets

(56) References Cited

U.S. PATENT DOCUMENTS

2009/0117366 A1* 5/2009 Honma ................ B29C 70/086
　　　　　　　　　　　　　　　　　　　　　　　　428/314.8
2010/0003594 A1    1/2010 Hong et al.

FOREIGN PATENT DOCUMENTS

| JP | 2006-128096 A | 5/2006 |
| JP | 2006-144141 A | 6/2006 |
| JP | 2007-184189 A | 7/2007 |

* cited by examiner

ADHESIVE SHEET FOR SEALING METAL TERMINALS OF FLAT ELECTROCHEMICAL CELL

CROSS REFERENCES TO RELATED APPLICATIONS

This application is a Continuation of U.S. application Ser. No. 11/858,328, filed Sep. 20, 2007, claims priority from Japanese Patent Application JP 2006-255618 filed in the Japan Patent Office on Sep. 21, 2006, and Japanese Patent Application JP 2007-239258 filed in the Japan Patent Office on Sep. 14, 2007, and the entire contents of which applications are hereby incorporated herein by reference.

BACKGROUND OF THE INVENTION

Field of the Invention

The invention relates to a packaging material for packaging a flat electrochemical cell main body containing an electrolyte (for example, liquid and solid electrolytes), as typified by batteries or capacitors. In more detail, the invention relates to an adhesive sheet for sealing metal terminals of a flat electrochemical cell which is interposed between a packaging body for packaging a flat electrochemical cell main body and metal terminals connected to each of a positive electrode and a negative electrode of the flat electrochemical cell main body, thereby adhering the packaging body to the metal terminals and also adhering the packaging bodies to each other with unconnected ends of the metal terminals protruding outside.

Description of the Related Art

As one of flat electrochemical cells, a lithium battery is exemplified. The lithium battery is also called a lithium secondary battery and is a battery containing, as an electrolyte, a solid high polymer material, a high polymer material in a gel form, a liquid and the like and generating electricity due to movement of a lithium ion. The lithium battery includes ones in which positive electrode/negative electrode active substances are each composed of a high polymer. The lithium secondary battery is configured of a lithium battery main body composed of positive electrode collector material (for example, aluminum)/positive electrode active substance layer (for example, metal oxides, carbon black, metal sulfides, electrolytic solutions, and high polymer positive electrode materials such as polyacrylonitrile)/electrolyte (for example, carbonate based electrolytic solutions such as propylene carbonate, ethylene carbonate, dimethyl carbonate, and ethyl methyl carbonate, inorganic solid electrolytes composed of a lithium salt, and gel electrolytes)/negative electrode active substance layer (for example, lithium metal, alloys, carbon, electrolytic solutions, and high polymer negative electrode materials such as polyacrylonitrile)/negative electrode collector material (for example, copper), a packaging body for packaging them, and the like. With respect to applications of the lithium secondary battery, the lithium secondary battery is used in personal computers, portable terminals (for example, mobile phones and PDA), video cameras, electric cars, storage batteries for energy storage, robots, satellites, and the like. In this specification, the positive electrode collector material and the positive electrode active substance layer are referred to as a positive electrode; and the negative electrode collector material and the negative electrode active substance layer are referred to as a negative electrode, respectively.

As the packaging body of a lithium battery, a metallic can obtained by press working a metal into a container in a cylindrical or rectangular parallelepiped form, a bag body obtained by working a laminate obtained by laminating a plastic film and a metal foil of aluminum or the like into a bag-like form or the like (this bag body will be hereinafter referred to as "packaging body"), and the like are useful.

Now, a packaging body composed of a metallic can is rigid, and the shape of a battery itself is determined by this. Accordingly, for example, when this is used for a mobile phone, there is involved a problem that since the size of a mobile phone main body is determined by the shape of the battery, the shape of the mobile phone cannot be freely designed. Then, there is a tendency that the foregoing packaging body is used because it is flexible so that the shape of the mobile phone main body can be freely designed to some extent. Furthermore, the reasons why there is a tendency that the foregoing packaging body is used are as follows. That is, when a battery is used at a high temperature and an internal pressure abnormally increases, there is a problem that a packaging body composed of a metallic can is dangerous because it withstands until explosion or ignition occurs. On the other hand, in the foregoing packaging body which is sealed in a thermal-adhesive part, the thermal-adhesive part is separated, whereby the packaging body works as a safety valve for releasing an internal pressure. Accordingly, though this packaging body loses the function as a battery, it is possible to reduce danger of explosion or ignition as compared with a packaging body composed of a metallic can.

From the standpoints of physical properties necessary for the lithium battery, workability, economy and the like, as illustrated in FIG. 2, a laminate A obtained by laminating at least a substrate layer A1, a barrier layer A2 composed of a metal foil of aluminum or the like and a thermal-adhesive resin layer A3 is used as the foregoing packaging body. This laminate A is worked into a bag body as illustrated in FIG. 3A (though the bag body in FIG. 3A is a pillow-type packaging bag, it may be a packaging bag of a three-side type or a four-side type or the like), thereby containing therein the lithium battery main body and metal terminals 31 connected to a positive electrode and a negative electrode of the lithium battery main body, respectively and an opening is sealed by thermal-adhesion with unconnected ends of the metal terminals protruding outside. Alternatively, as illustrated in FIG. 4A, this laminate A is press molded to form a recess in such a manner that the thermal-adhesive resin layer is located inward; the lithium battery main body and the metal terminals 31 connected to a positive electrode and a negative electrode of the lithium battery main body, respectively are contained in this recess with unconnected ends of the metal terminals protruding outside; the recess is covered such that the thermal-adhesive resin layer of a separately prepared laminate A in a sheet form (not illustrated) is located on the side of the recess; and the edge is sealed by thermal-adhesion. The thus formed material is used as a lithium battery 10 as illustrated in FIG. 3B or FIG. 4B. A symbol S denotes a thermal-adhesive part.

The thermal-adhesive resin layer A3 configuring the packaging body (laminate A) is required to have thermal-adhesive properties between the thermal-adhesive resin layers A3 each other and thermal-adhesive properties to the metal terminals 31 protruding outside of the packaging body from the lithium battery main body. For such a thermal-adhesive resin layer, acid-modified polyolefin based resins having excellent adhesive properties to a metal, for example, polyolefin resins graft-modified with an unsaturated carboxylic acid, copolymers of ethylene or propylene with acrylic acid or methacrylic acid, metal-crosslinked polyolefin resins, and the like were used.

However, when the acid-modified polyolefin based resin is used in the thermal-adhesive resin layer A3 configuring the packaging body (laminate A), there are a problem that in comparison with a general polyolefin based resin (this resin mean a linear or branched olefin based resin composed of carbon and hydrogen; hereinafter referred to as "general polyolefin based resin"), its splipperiness is poor and when worked in a bag-like form, wrinkles are formed; and a problem that there is a possibility that when press molded to form a recess, pinholes or cracks are generated. Then, there has become employed a method in which as a replacement of this, a general polyolefin based resin is used in the thermal-adhesive resin layer A3 and an adhesive sheet for sealing metal terminals of a lithium battery composed of a single layer of the foregoing acid-modified polyolefin based resin which can be thermally adhered to both of this general polyolefin based resin and the metal terminals 31 or plural layers thereof formed by putting the acid-modified polyolefin based resin on at least one surface layer of the single layer (this adhesive sheet for sealing metal terminals of a lithium battery will be sometimes referred to as "adhesive sheet") is made to intervene between the metal terminals and the thermal-adhesive resin layer, followed by thermal-adhesion to achieve sealing.

Concretely explaining, as illustrated in FIG. 5, the respective metal terminals 31 (see FIG. 3B and FIG. 4B) are protruded to the outside of the packaging body from a lithium battery main body 30 prior to injecting an electrolyte, and for example, an adhesive sheet 1' for sealing metal terminals composed of the foregoing acid-modified polyolefin based resin single layer is fixed on both surfaces of the metal terminals 31 with a temporarily adhesive seal. The lithium battery main body 30 is contained in the recess of the laminate A having a recess formed therein by press molding as illustrated in FIG. 4A; the recess is covered by a separately prepared laminate A in a sheet form (not illustrated); three edges including the edge provided with the metal terminals 31 of the lithium battery main body 30 are thermally adhered; and an electrolyte is then injected from the edge of one non-adhesive part; and thereafter, this edge is sealed by thermal-adhesion. A lithium battery 10 as illustrated in FIG. 4B is thus formed.

Now, the respective metal terminals 31 of the lithium battery 10 is thermally adhered in a site having the adhesive sheet 1' provided therein in a state that it is interposed by the packaging body (laminate A). At that time, the metal terminals 31 has a thickness of at least about 50 μm and a width of at least about 2.5 mm. In order to ensure a sealed state by filling spaces of both side parts of the metal terminals 31 with the adhesive sheet 1' and the thermal-adhesive resin layer A3 of the packaging body (laminate A), heat and pressure for thermal-adhesion are necessary. Accordingly, there was a problem that the adhesive sheet 1' and the thermal-adhesive resin layer A3 of the packaging body (laminate A) are pushed out to the outside of a pressurized part, whereby the pressurized part becomes thin-walled. Also, in general, in cutting in a small width, burrs of from several μm to several tens μm are formed in the both side ends of the metal terminals 31. As a result, there was a problem that the barrier layer A2 of the packaging body (laminate A) which is composed of a metal foil of aluminum or the like comes into contact with the metal terminals 31 to cause a short circuit.

Also, in order to improve this problem, as the adhesive sheet 1' to be used for the both surfaces of the metal terminals 31, a battery terminal covering material composed of a laminated film having a three-layer configuration in which both surfaces of a heat resistant resin film are covered with a film which is heat sealable to an inner film of a battery packaging material (this battery terminal covering material is corresponding to the foregoing adhesive sheet for sealing a metal terminals) is proposed (see, for example, Patent Document 1). However, when the battery terminal covering material as described in Patent Document 1 is used, though a phenomenon of the generation of the foregoing short circuit is improved as compared with one composed of an acid-modified polyolefin based resin single layer, a layer-to-layer adhesive strength between the heat resistant resin film and the film which is heat sealable to the inner film of the battery packaging material is not sufficient. For that reason, when battery components causes abnormal heat generation, a gas is generated in the inside of the battery and an internal pressure of the battery increases, there was a possibility that separation takes place at an interface between the heat resistant resin film and the film which is heat sealable to the inner film of the battery packaging material due to a stress for separating the battery packaging material and the metal terminals from each other in the parts where the metal terminals are held. In addition to the lithium battery containing a lithium battery main body therein, when a capacitor or an electric double layer capacitor is contained, the same problem is also caused.

SUMMARY OF THE INVENTION

Then, in view of the foregoing problems, the invention has been made. In a packaging body provided with at least an inner layer composed of a thermal-adhesive polyolefin based resin (general polyolefin based resin) and a barrier layer composed of a metal foil, in which metal terminals connected to a positive electrode and a negative electrode, respectively are interposed with unconnected ends of the metal terminals protruding outside and sealed in a thermal-adhesive edge, the invention is to provide an adhesive sheet for sealing metal terminals of a flat electrochemical cell which is not only able to prevent a short circuit between the barrier layer of the packaging body composed of a metal foil of aluminum or the like and the metal terminals to achieve sealing in a stable state but high in a layer-to-layer adhesive strength (hereinafter referred to as "laminate strength") and a low possibility of a reduction in battery performance to be caused due to invasion of moisture.

In order to solve the foregoing problems, the invention is concerned with an adhesive sheet for sealing metal terminals of a flat electrochemical cell, the flat electrochemical cell including packaging material provided with, at least, an inner layer formed of a polyolefin based thermal-adhesive resin and a barrier layer formed of a metal foil, an electrochemical device provided with a positive electrode and a negative electrode, and metal terminals connected to the positive electrode and the negative electrode, respectively, the electrochemical device being enclosed in the packaging material and sealed therein by the thermal-adhesive resin at edges of the packaging material, the metal terminals being held between edges of the packaging material, with unconnected ends of the metal terminals protruding outside, the adhesive sheet being interposed between the inner layer and the metal terminals where the metal terminals protrude out through the packaging material, wherein the adhesive sheet is a fibrous sheet or a porous sheet coated with an acid-modified polyolefin based resin layer adhesive to the inner layer and the metal terminals.

By taking such a configuration, it is possible to provide an adhesive sheet for sealing metal terminals of a flat electrochemical cell which is not only able to prevent a short circuit between the barrier layer of the packaging body composed of a metal foil of aluminum or the like and the metal terminals to achieve sealing in a stable state but high in a layer-to-layer adhesive strength (hereinafter referred to as "laminate strength"). According to this, even when thermal components causes abnormal heat generation, a gas is generated in the inside of the battery and an internal pressure of the battery increases, it is possible to provide a flat electrochemical cell capable of preventing a phenomenon in which separation takes place at an interface between the heat resistant resin film and the film which is heat sealable to an inner film of a battery packaging material to be caused due to a stress for separating the battery packaging material and the metal terminals from each other in parts where the metal terminals are held from occurring and having high safety.

Also, in the invention, in the adhesive sheet for sealing metal terminals of a flat electrochemical cell having the foregoing configuration, the fibrous sheet is composed of a natural fiber or a chemical fiber made of a synthetic resin having a melting point of 200° C. or higher. By taking such a configuration, in interposing the metal terminals and achieving thermal-adhesion, a short circuit between the barrier layer composed of a metal foil of aluminum or the like of the packaging material and the metal terminals can be favorably prevented.

Also, in the invention, in the adhesive sheet for sealing metal terminals of a flat electrochemical cell having the foregoing configuration, the fibrous sheet is composed of a wholly aromatic polyester based fiber as the major component. By taking such a configuration, the wholly aromatic polyester based fiber is high in a melting point because of its molecular skeleton and excellent in heat resistance. Furthermore, the wholly aromatic polyester based fiber is excellent in chemical resistance (especially resistance to electrolytic solution) and low moisture absorption and is able to prevent not only a short circuit between the barrier layer composed of a metal foil of aluminum or the like of the packaging material and the metal terminals but delamination in the electrolytic solution.

Also, in the invention, in the adhesive sheet for sealing metal terminals of a flat electrochemical cell having the foregoing configuration, the wholly aromatic polyester based fiber is composed of a melt-anisotropic wholly aromatic polyester fiber. By taking such a configuration, the melt-anisotropic wholly aromatic polyester is an aromatic polyester exhibiting optical anisotropy (liquid crystallinity) in the molten state, and in a fiber obtained by spinning this, the optical anisotropy (liquid crystallinity) further advances. Accordingly, not only the melt-anisotropic wholly aromatic polyester is excellent in mechanical strength, heat resistance and chemical resistance (especially resistance to electrolytic solution), but the acid-modified polyolefin based resin penetrates into spaces formed by division and fractionation. Thus, ah adhesive sheet having an extremely high layer-to-layer strength can be obtained.

Also, in the invention, in the adhesive sheet for sealing metal terminals of a flat electrochemical cell having the foregoing configuration, the fibrous sheet composed of the wholly aromatic polyester based fiber has a moisture absorption rate of not more than 0.1% under an environment at 25° C. and 65% RH. By taking such a configuration, the occurrence of a phenomenon in which moisture goes along a non-woven fabric constituted of the melt-anisotropic wholly aromatic polyester fiber and penetrates into the inside can be suppressed. According to this, a phenomenon in which water vapor goes through edge surfaces of the adhesive sheet from the parts where the metal terminals are held and invades into the inside of the flat electrochemical cell can be prevented from occurring; and a flat electrochemical cell having extremely high safety can be obtained. The "moisture absorption rate" as referred to in the invention means a change in weight of a sample in terms of a weight percentage when the sample is stored under a fixed temperature and humidity condition and the weight of the sample reaches an equilibrium state.

Also, in the invention, in the adhesive sheet for sealing metal terminals of a flat electrochemical cell having the foregoing configuration, the porous sheet is composed of a synthetic resin having a melting point of 200° C. or higher. By taking such a configuration, in interposing the metal terminals and achieving thermal-adhesion, a short circuit between the barrier layer composed of a metal foil of aluminum or the like of the packaging material and the metal terminals can be favorably prevented.

Also, in the invention, in the adhesive sheet for sealing metal terminals of a flat electrochemical cell having the foregoing configuration, the polyolefin based resin which forms the inner layer is composed of polypropylene, and the acid-modified polyolefin based resin is a polypropylene graft-modified with an unsaturated carboxylic acid. By taking such a configuration, a phenomenon in which water vapor goes through edge surfaces of the adhesive sheet from the parts where the metal terminals are held and penetrates into the inside of the flat electrochemical cell can be prevented from occurring; and a flat electrochemical cell having extremely high safety can be obtained.

According to the invention, it is possible to provide an adhesive sheet for sealing metal terminals of a flat electrochemical cell having a strong layer-to-layer strength (laminate strength) which is not only able to prevent a short circuit between the barrier layer of the packaging body composed of a metal foil of aluminum or the like and the metal terminals, an issue of which has hitherto been considered problematic, but excellent in sealing properties and water vapor barrier properties. Also, in the adhesive sheet using a non-woven fabric composed of a wholly aromatic polyester based fiber, it is possible to provide an adhesive sheet which is not only excellent in mechanical strength, heat resistance and resistance to electrolytic solution but extremely high in a layer-to-layer strength.

DESCRIPTION OF THE PREFERRED EMBODIMENTS

Figure 2:
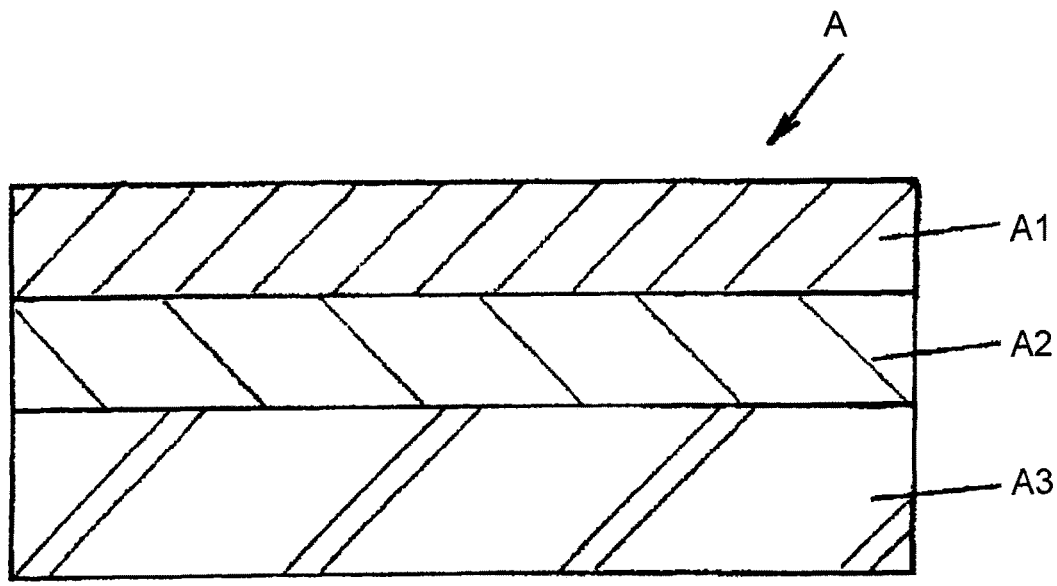
FIG. 2 is a view to explanatorily illustrate a basic layer configuration of a packaging body which is used in a flat electrochemical cell.

First of all, a packaging body of a flat electrochemical cell which is provided for the invention is described. A laminate A obtained by laminating at least a substrate layer A1, a barrier layer A2 composed of a metal foil of aluminum or the like and a thermal-adhesive resin layer A3 composed of a general polyolefin based resin as illustrated in FIG. 2 can be used as the packaging body. Examples of the substrate layer Al which can be used include a biaxially stretched polyester film, a biaxially stretched nylon film and a laminate thereof; and its thickness is from about 6 to 30 µm. Examples of the barrier layer A2 which can be used include a metal foil of aluminum, nickel, stainless steel, or the like; and its thickness is from approximately 15 to 80 µm. Examples of the general polyolefin based resin forming the thermal-adhesive resin layer A3 which can be used include single substances or mixtures of ethylene based resins such as low-density polyethylene, medium-density polyethylene, high-density polyethylene, linear low-density polyethylene, and an ethylene-butene copolymer; and propylene based resins such as homopolypropylene, an ethylene-propylene copolymer, and an ethylene-propylene-butene copolymer; and its thickness is from approximately 20 to 100 µm.

Next, the invention is described in detail with reference to the accompanying drawings and so on. The form of a flat electrochemical cell battery is the same as the form as described previously regarding the related art and is explained by referring to the drawings of the related art.

Figure 1:
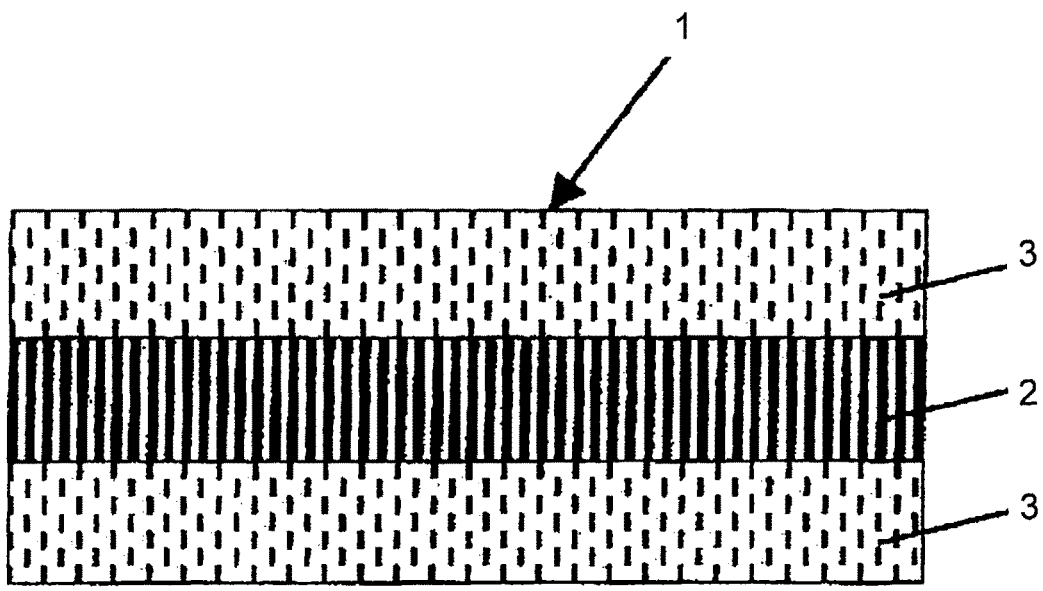
FIG. 1 is a view to explanatorily illustrate a typical layer configuration of an adhesive sheet for sealing metal terminals of a flat electrochemical cell according to the invention.
Figure 3A:
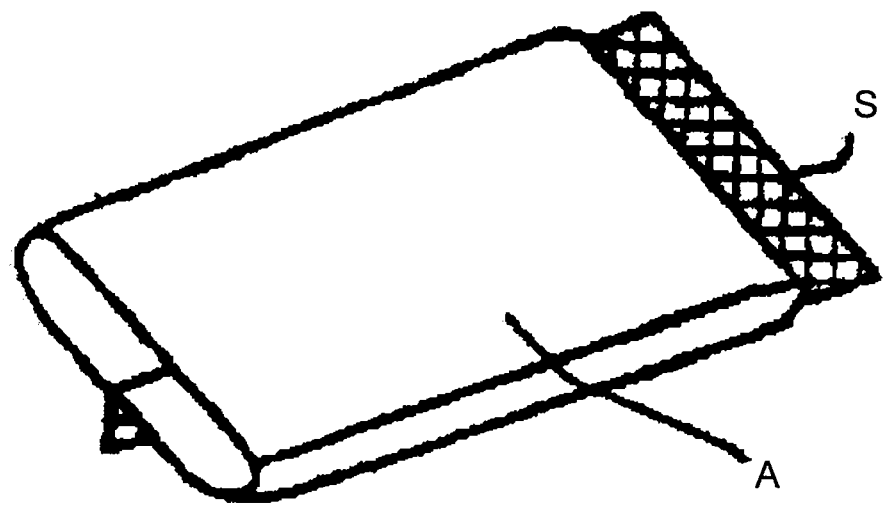
FIGS. 3A and 3B are each a view to explain an embodiment of a packaging body which is used in a flat electrochemical cell.
Figure 3B:
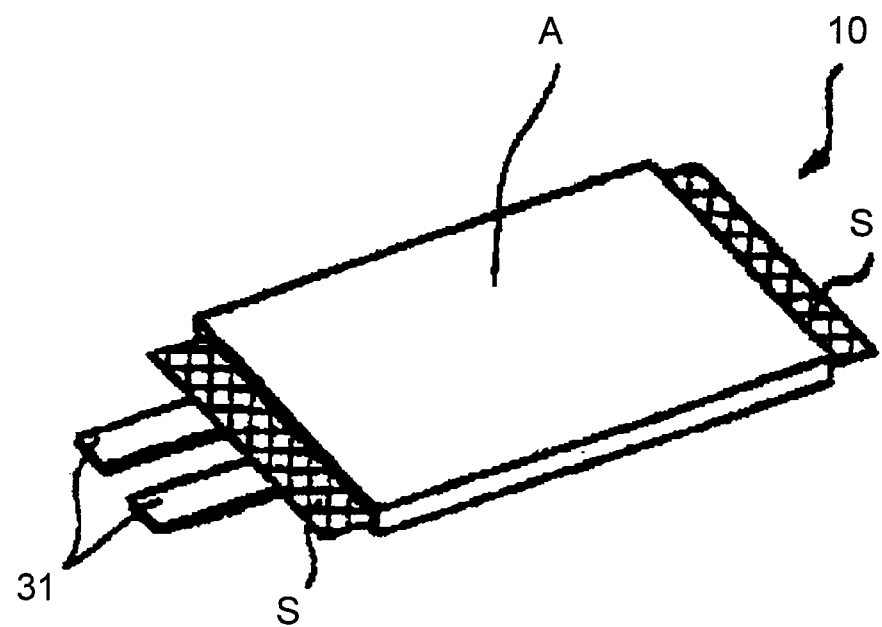
Figure 4A:
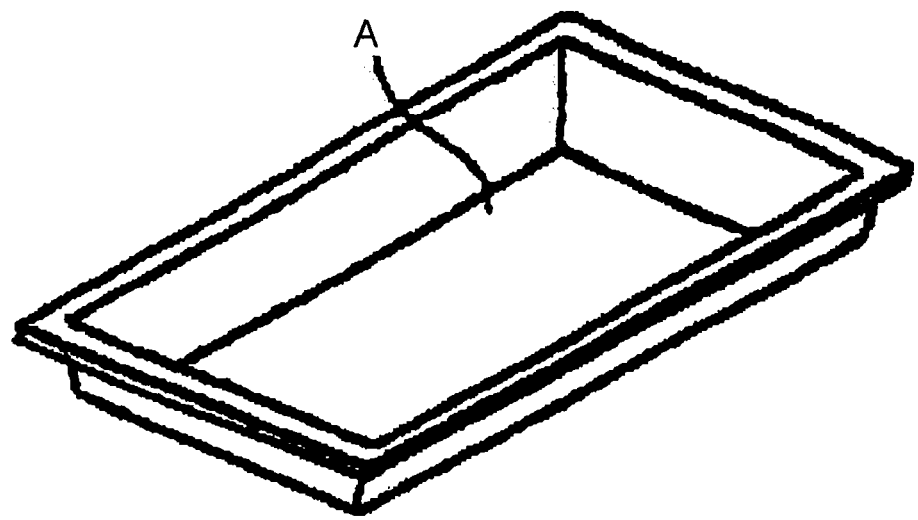
FIGS. 4A and 4B are each a view to explain another embodiment of a packaging body which is used in a flat electrochemical cell.
Figure 4B:
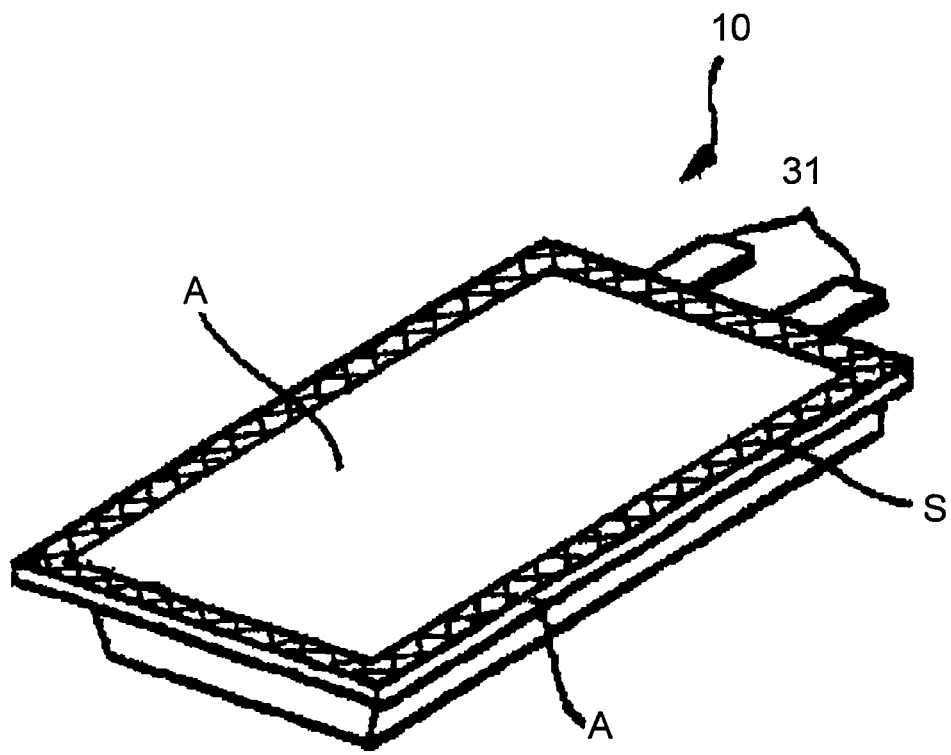
Figure 5:
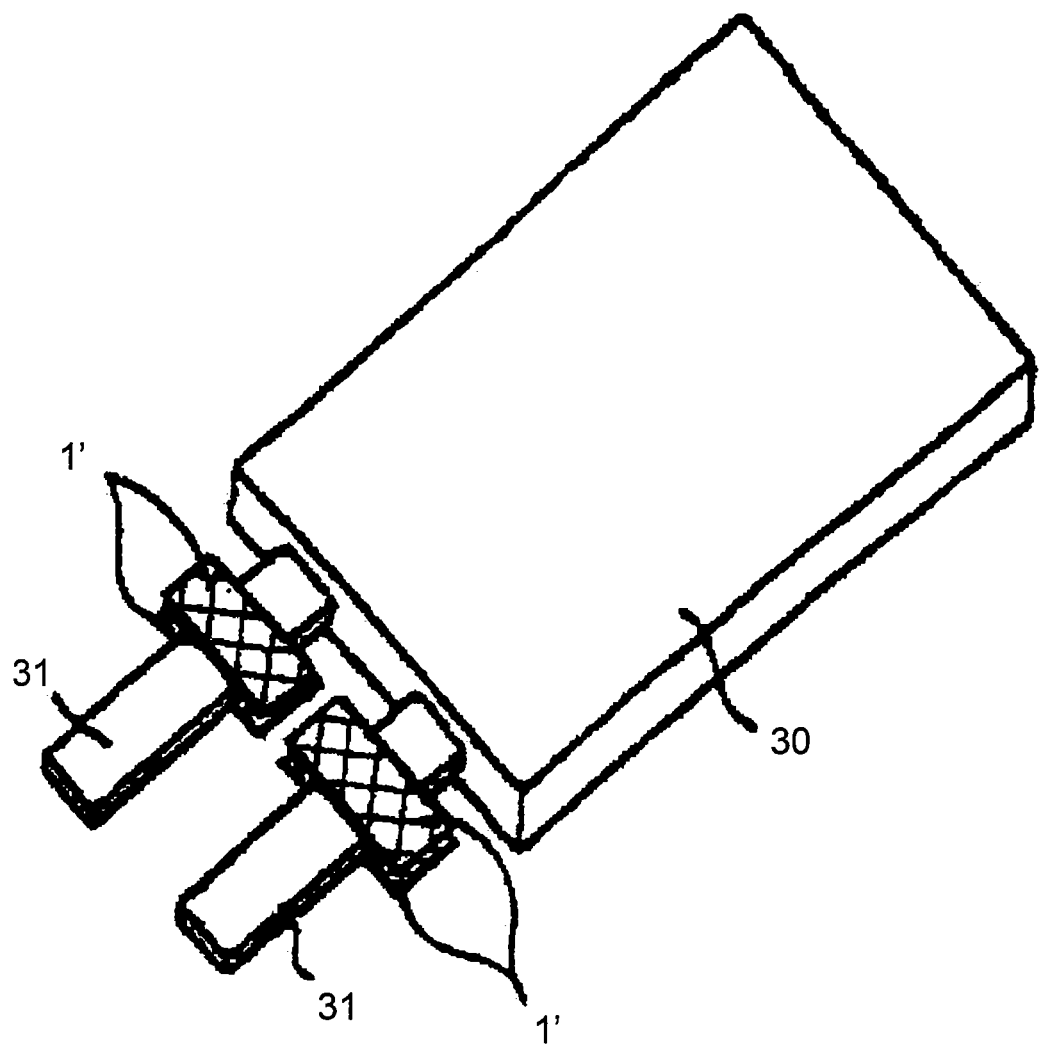
FIG. 5 is a view to explain an embodiment for providing an adhesive sheet for sealing metal terminals which is used in parts of a flat electrochemical cell where the metal terminals are held.

FIG. 1 is a view to explanatorily illustrate a typical layer configuration of an adhesive sheet for sealing metal terminals of a flat electrochemical cell according to the invention; FIG. 2 is a view to explanatorily illustrate a basic layer configuration of a packaging body which is used in a flat electrochemical cell; FIGS. 3A and 3B are each a view to explain an embodiment of a packaging body which is used in a flat electrochemical cell; FIGS. 4A and 4B are each a view to explain another embodiment of a packaging body which is used in a flat electrochemical cell; and FIG. 5 is a view to explain an embodiment for providing an adhesive sheet for sealing metal terminals which is used in parts of a flat electrochemical cell where the metal terminals are held. In the drawings, 1 and 1' each denotes an adhesive sheet for sealing metal terminals of a flat electrochemical cell; 2 denotes a fibrous sheet or a porous sheet; 3 denotes an acid-modified polyolefin layer; 10 denotes a flat electrochemical cell; 30 denotes a flat electrochemical cell main body; 31 denotes metal terminals; A denotes a laminate; A1 denotes a substrate layer; A2 denotes a barrier layer composed of a metal foil; and A3 denotes a thermal-adhesive resin layer.

FIG. 1 is a view to explanatorily illustrate a layer configuration of an adhesive sheet for sealing metal terminal s of a flat electrochemical cell battery according to the invention. The adhesive sheet 1 for sealing metal terminal s of a flat electrochemical cell is configured such that the acid-modified polyolefin based resin 3 adhesive to the thermal-adhesive resin layer A3 (corresponding to an inner layer) and the metal terminals 31 penetrates into the fibrous sheet or a porous sheet 2 to fill spaces of the fibrous sheet or porous sheet 2 and covers the both surfaces of the fibrous sheet or porous sheet 2.

Next, the fibrous sheet or porous sheet 2 is described. As described previously in the section of the related art, the adhesive sheet 1 for sealing metal terminals of a flat electrochemical cell (hereinafter sometimes referred to as "adhesive sheet") is made to intervene between the metal terminals 31 and an outer film (corresponding to the laminate A) in a thermal-adhesive edge of the flat electrochemical cell 10 and thermally adhered and is required to have heat resistance and resistance to electrolytic solution such that it is not melted and crushed by heat (from 160 to 190° C.) and pressure (from 1.0 to 2.0 MPa) at the thermal-adhesion. For that reason, a fiber or resin configuring the fibrous sheet or porous sheet is required to have heat resistance and resistance to electrolytic solution. Examples of the fiber which can be used include natural fibers such as celluloses, wools, silks, cottons, and hemps; glass fibers, carbon fibers and rock wools; chemical fibers obtained by fibrillating well known heat resistant synthetic resins such as polyesters, polyamides, polyimides, polymethylpentenes, polyphenylene oxides, polysulfones, polyetherether ketones, and polyphenylene sulfides; and materials obtained by making an unstretched sheet or an uniaxially or biaxially stretched sheet composed of the foregoing well known heat resistant synthetic resin porous.

As the fibrous sheet, non-woven fabrics composed of a polyester fiber, especially a wholly aromatic polyester fiber which is synthesized by combining three monomers of an aromatic diol, an aromatic dicarboxylic acid and an aromatic hydroxylcarboxylic acid while altering a composition ratio and which does not contain an aliphatic hydrocarbon in the principal chain thereof, such as a copolymer of p-hydroxybenzoic acid and 6-hydroxy-2-napthoic acid ("VECTRAN" as manufactured by Kuraray Co., Ltd.) and a copolymer of p-hydroxybenzoic acid, terephthalic acid and 4,4'-dihydroxybisphenyl ("SUMIKA SUPER" as manufactured by Sumitomo Chemical Co., Ltd.) are preferable. In the wholly aromatic polyester, molecular orientation (melt anisotropy) is observed in the molten state, and in fibers obtained by spinning this (melt-anisotropic wholly aromatic polyester fiber), the molecular orientation further advances. Accordingly, fibers are easy to entangle with each other; and a heat resistant non-woven fabric having a strong mechanical strength and a low moisture absorption are obtained. Also, the resin is easy to penetrate into spaces formed by division and fractionation; and a heat resistant non-woven fabric having excellent resin impregnation properties is obtained. Thus, a heat resistant non-woven fabric composed of a melt-anisotropic wholly aromatic polyester fiber is the most preferable.

From the standpoint that an osmotic properties of the acid-modified polyolefin based resin to be coated and penetrated in the molten state and a thickness of the resin after the penetration can be freely changed, it is preferable that the non-woven fabric configured of such a melt-anisotropic wholly aromatic polyester fiber has a basis weight of from 5 to 25 g/m$^2$ and a density of from 0.15 to 0.45 g/cm$^3$. When the basis weight is less than 5 g/m$^2$ or the density is less than 0.15 g/cm$^3$, the effect for preventing a short circuit cannot be expected, and there is a possibility that the non-woven fabric is insufficient in strength and inferior in working aptitude. When the basis weight exceeds 25 g/m$^2$ or the density exceeds 0.45 g/cm$^3$, the acid-modified polyolefin based resin layer to be melt coated hardly penetrates, and the thickness of the acid-modified polyolefin based resin layer becomes thin due to restrictions of the total thickness of the adhesive sheet. Accordingly, there is a possibility that a sufficient seal strength is not obtained due to seal thinning.

It is preferable that the non-woven fabric configured of such a melt-anisotropic wholly aromatic polyester fiber has a moisture absorption rate of not more than 0.1% under an environment at 25° C. and 65% RH. By regulating the moisture absorption rate at not more than 0.1%, the occurrence of a phenomenon in which moisture goes along the non-woven fabric constituted of the melt-anisotropic wholly aromatic polyester fiber and penetrates into the inside can be suppressed. According to this, a phenomenon in which water vapor goes through edge surfaces of the adhesive sheet from the parts where the metal terminals are held and invades into the inside of the flat electrochemical cell can be prevented from occurring; and a flat electrochemical cell having extremely high safety can be obtained.

The non-woven fabric configured of such a melt-anisotropic wholly aromatic polyester fiber can be manufactured by any method of a wet method and a dry method. From the standpoints of costs, solvent resistance and the like, a dry method is preferable, and a melt blown method is especially preferable. Concretely, the melt blown method is a method in which a melt-anisotropic wholly aromatic polyester is melt spun, the spinning product is simultaneously blown away by a high-temperature high-speed fluid and accumulated on a collecting surface to form a web, and the web is then subjected to calendaring and heat treatment to manufacture a non-woven fabric. As such a melt-anisotropic wholly aromatic polyester non-woven fabric, for example, "VECLS" as manufactured by Kuraray Co., Ltd. can be used.

As a method for forming a porous sheet, methods including a needle punch method of pressing a heated needle; an embossing roll method; a hot melt perforation method of melting and perforating an unstretched sheet or a uniaxially or biaxially stretched sheet by using a polishing roll, a grindstone, a polishing tape, etc.; a physical perforation method using a knife, a cutter, a cutting edge-equipped roll (rotary die roll), etc.; and processing method such as laser beam processing, corona discharge, and plasma discharge may be properly chosen and employed. Alternatively, a porous sheet may be formed by a method of forming the heat resistant synthetic resin having an inorganic substance kneaded therewith into a sheet and simultaneously stretching the sheet. Taking into consideration burrs of the metal terminals and a resin thinning after heat sealing of the acid-modified polyolefin based resin layer, a thickness of the adhesive sheet after covering the fibrous sheet or porous sheet with the acid-modified polyolefin based resin is preferably from 50 to 120 μm.

Next, a method in which the acid-modified polyolefin based resin 3 is coated on and penetrated into the both surfaces of the fibrous sheet or porous sheet to fill spaces of the fibrous sheet or porous sheet and simultaneously cover the both surfaces of the fibrous sheet or porous sheet is described. A fibrous sheet or porous sheet in a sheet form is first drawn out; an acid-modified polyolefin based resin in the molten state is extruded and coated on one surface of the sheet; and an acid-modified polyolefin based resin in the molten state is then laminated on the other surface of the sheet upon being extruded and coated, thereby forming a laminate.

Next, the acid-modified polyolefin based resin 3 is described. The acid-modified polyolefin based resin 3 is a layer provided for the purpose of thermally adhered to both of the metal terminals 31 (see FIG. 5) and the thermal-adhesive resin layer A3 (see FIG. 2) composed of a general polyolefin based resin which is an inner layer of the packaging body and is required to be properly chosen and used depending upon the resin species to be used for the thermal-adhesive resin layer A3 (see FIG. 2). As the acid-modified polyolefin based resin 3, the acid-modified polyolefin based resins as described previously in the section of the related art can be used. Exemplifying again, polyolefin resins graft-modified with an unsaturated carboxylic acid, copolymers of ethylene or propylene with acrylic acid or methacrylic acid, metal-crosslinked polyolefin resins, and the like are useful; and 5% or more of a butene component, an ethylene-propylene-butene copolymer, an amorphous ethylene-propylene copolymer, a propylene-a-olefin copolymer, an olefin based elastomer, or the like may be added thereto as the need arises. Taking into consideration moistureproofness and heat resistance, polyolefin resins graft-modified with an unsaturated carboxylic acid are preferable, and polypropylene resins graft-modified with an unsaturated carboxylic acid are especially preferable. Also, taking into consideration the durability due to abnormal heat generation or an increase of the internal pressure, resins in which an olefin based elastomer not having a melting point at not higher than 120° C. is added are favorable.

The acid-modified polyolefin layer 3 is formed by heat melting and extruding the foregoing acid-modified polyolefin based resin onto the fibrous sheet or porous sheet 2 from a T-die extruder. A thickness of the acid-modified polyolefin layer 3 is 10 μm or more, and preferably from 20 to 60 μm. When the thickness of the acid-modified polyolefin layer 3 is less than 10 μm, the amount of heat of the extruded molten resin is insufficient so that a sufficient laminate strength is not obtained; and it is difficult to obtain a sufficient seal strength for such a reason that the strength of the acid-modified polyolefin based resin is insufficient due to seal thinning. When the thickness of the acid-modified polyolefin layer 3 exceeds 60 μm, the total thickness of the adhesive sheet increases, the water vapor barrier properties are reduced from the edge surface, and it becomes difficult to obtain a remarkable enhancement effect in cost effectiveness (for example, in laminate strength and seal strength).

The acid-modified polyolefin based resin 3 may be made as a colored layer by adding a pigment as the need arises. As the pigment to be used, various inorganic pigments can be used. Carbon (carbon and graphite) is preferable for such reasons that it is a material to be generally used in the inside of a battery; that there is no possibility that it causes elution against an electrolytic solution; that a sufficient coloring effect is obtained in an addition amount to an extent that the coloring effect is large and adhesive properties are not hindered; that it is not melted by heat; that it can enhance an apparent melting viscosity of the added resin; and that a reduction of the seal strength can be prevented while preventing thinning in wall of a pressurized part at the thermal-adhesion (at the sealing). When carbon black having an average particle size of about 0.03 μm is used, the addition amount of carbon black is preferably from 0.05 to 0.3 parts by weight, and more preferably from 0.1 to 0.2 parts by weight based on 100 parts by weight of the resin. By making the acid-modified polyolefin layer 3 as a colored layer, it is possible to make it easy to detect the presence or absence of the adhesive sheet 1 by a sensor or through visual observation.

The invention is hereunder described in more detail with reference to the following Examples.

(Preparation of Laminate for Flat Electrochemical Cell)

One surface of an aluminum foil (thickness: 40 μm), the both surfaces of which had been previously subjected to chemical conversion coating with a chemical conversion coating liquid consisting of a phenol resin, a chromium (III) fluoride compound and phosphoric acid (phosphoric acid-chromate treatment), and a biaxially stretched nylon film having a thickness of 25 μm were laminated via a urethane based adhesive; the other surface of the foregoing aluminum foil and an unstretched polypropylene film having a thickness of 30 μm were subjected to sandwich lamination with an acid-modified polypropylene resin (polypropylene graft-modified with an unsaturated carboxylic acid); and the resulting aluminum foil was heated with a hot wind at a temperature of a softening point or higher of the foregoing acid-modified polypropylene resin, thereby preparing a laminate to be provided for the Examples.

(Preparation of Adhesive Sheet for Sealing Metal Terminals of Flat electrochemical Cell)

EXAMPLE 1

A maleic acid-modified polypropylene was extruded and coated in a thickness of 46 μm on one surface of a non-woven fabric composed of a melt-anisotropic wholly aromatic polyester fiber (basis weight: 9 g/cm², thickness: 40 μm, density: 0.16 g/cm³, moisture absorption rate: not more than 0.1% (at 25° C. and 65% RH); "VECLS MBBK9F" as manufactured by Kuraray Co., Ltd.) by a T-die extruder; and a maleic acid-modified polypropylene was then extruded and coated in a thickness of 46 μm on the other surface of the non-woven fabric by a T-die extruder, thereby obtaining an adhesive sheet of the invention having a total thickness of 100 μm.

EXAMPLE 2

Maleic acid-modified polypropylene was extruded and coated in a thickness of 44 μm on one surface of a non-woven fabric composed of a melt-anisotropic wholly aromatic polyester fiber (basis weight: 14 g/cm², thickness: 50 μm, density: 0.21 g/cm³, moisture absorption rate: not more than 0.1% (at 25° C. and 65% RH); "VECLS MBBK14F" as manufactured by Kuraray Co., Ltd.) by a T-die extruder; and a maleic acid-modified polypropylene was then extruded and coated in a thickness of 44 μm on the other surface of the non-woven fabric by a T-die extruder, thereby obtaining an adhesive sheet of the invention having a total thickness of 100 μm.

EXAMPLE 3

Maleic acid-modified polypropylene was extruded and coated in a thickness of 38 μm on one surface of a non-woven fabric composed of a melt-anisotropic wholly aromatic polyester fiber (basis weight: 22 g/cm², thickness: 89 μm, density: 0.28 g/cm², moisture absorption rate: not more than 0.1% (at 25° C. and 65% RH); "VECLS MBBK22F" as manufactured by Kuraray Co., Ltd.) by a T-die extruder; and a maleic acid-modified polypropylene was then extruded and coated in a thickness of 38 μm on the other surface of the non-woven fabric by a T-die extruder, thereby obtaining an adhesive sheet of the invention having a total thickness of 100 μm.

EXAMPLE 4

Maleic acid-modified polypropylene was extruded and coated in a thickness of 44 μm on one surface of a non-woven fabric composed of a polyethylene terephthalate fiber (basis weight: 15.0 g/cm², thickness: 35 μm, density: 0.22 g/cm²) by a T-die extruder; and a maleic acid-modified polypropylene was then extruded and coated in a thickness of 44 μm on the other surface of the non-woven fabric by a T-die extruder, thereby obtaining an adhesive sheet of the invention having a total thickness of 100 μm.

EXAMPLE 5

Maleic acid-modified polyethylene was extruded and coated in a thickness of 44 μm on one surface of a non-woven fabric composed of a melt-anisotropic wholly aromatic polyester fiber (basis weight: 14 g/cm², thickness: 50 μm, density: 0.21 g/cm³, moisture absorption rate: not more than 0.1% (at 25° C. and 65% RH); "VECLS MBBK14F" as manufactured by Kuraray Co., Ltd.) by a T-die extruder; and a maleic acid-modified polyethylene was then extruded and coated in a thickness of 44 μm on the other surface of the non-woven fabric by a T-die extruder, thereby obtaining an adhesive sheet of the invention having a total thickness of 100 μm.

COMPARATIVE EXAMPLE 1

On one surface of PET (12 μm), the both surfaces of which had been subjected to a corona discharge treatment, an isocyanate based adhesion promoter was coated in an amount of 50 mg/m² as solids and maleic acid-modified polypropylene (hereinafter referred to as "PPa") was extruded and coated in a thickness of 44 μm by a T-die extruder; and thereafter, maleic acid-modified polypropylene was extruded and coated in a thickness of 44 μm on the other surface of the PET (12 μm) by a T-die extruder, followed by an aging treatment at 45° C. for 72 hours to obtain an adhesive sheet of Comparative Example 1.

COMPARATIVE EXAMPLE 2

Maleic acid-modified polypropylene film having a thickness of 100 μm was made as an adhesive sheet.

Each of the foregoing adhesive sheets as prepared in Examples 1 to 5 and Comparative Examples 1 and 2 was evaluated with respect to initial laminate strength and laminate strength after dipping in an electrolytic solution (electrolytic solution-resisting laminate strength), initial seal strength and seal strength after sealing an electrolytic solution (electrolytic solution-resisting seal strength), insulation properties, water vapor barrier properties, resistance to heat shrinkage and presence or absence of leakage in the following evaluation methods, and the obtained results are summarized and shown in Table 1.

(1) Initial Laminate Strength:

The adhesive sheet was cut in a width of 15 mm; ethyl acetate was coated on an adhesion interface and simultaneously partially separated from an edge surface thereof and measured at a tensile rate of 50 mm/min by a tensilon. At that time, an average strength thereof was defined as a measured value. In achieving the partial separation, the case where cohesive failure occurred between the resin layers, film breakage was caused and the laminate strength could not be measured was defined as "failure in separation".

(2) Electrolytic Solution-Resisting Laminate Strength:

The adhesive sheet was cut into a rectangle of 30×70 mm and dipped in an electrolytic solution (1 mole/liter of a lithium hexafluorophosphate solution) at 60° C. for 7 days. Thereafter, the resulting adhesive sheet was taken out, and the both edges thereof were trimmed in a width of 7.5 mm, respectively to prepare a test sample of 15×70 mm. This test sample was partially separated in the same manner as in the foregoing measurement of initial laminate strength and measured at a tensile rate of 50 mm/min by a tensilon. At that time, an average strength thereof was defined as a measured value. In achieving the partial separation, the case where cohesive failure occurred between the resin layers, film breakage was caused and the laminate strength could not be measured was defined as "failure in separation".

(3) Initial Seal Strength:

An aluminum foil (a metal terminal) having a width of 4 mm, a length of 30 mm and a thickness of 100 μm, which had been subjected to a phosphoric acid-chromate treatment, was interposed between two adhesive sheets (width: 8 mm, length: 15 mm) and sealed by a hot plate having a width of 25 mm in an orthogonal direction to the length direction of the aluminum foil (sealing condition (twice): 190° C., 0.5 MPa, 3 seconds), thereby preparing a sample having an aluminum metal terminal, the both surfaces of which had been interposed by the two adhesive sheets (hereinafter referred to as "adhesive sheet-provided aluminum terminal sample"). The above-prepared laminate making a packaging body was cut to prepare two laminate test samples of 60×75 mm. The two laminate samples were superimposed such that the sealant film surfaces thereof were faced each other, and the above-prepared adhesive sheet-provided aluminum terminal sample was inserted into the edge with a length of 60 mm. The edge into which the adhesive sheet-provided aluminum terminal sample had been inserted was sealed by a hot plate (sealing condition: 190° C., 1.0 MPa, 3 seconds), followed by cutting along the aluminum terminal. There was thus prepared a sample for measuring an initial seal strength having a width of 4 mm and a length of 30 mm, in which the adhesive sheet and the laminate were integrated on the both surfaces of the aluminum foil. The respective laminates on the both surfaces of the metal terminal of this sample for measuring an initial seal strength were fixed by a tool and measured for a seal strength at a tensile rate of 300 mm/min by an autograph. At that time, an average strength thereof was defined as a measured value. The obtained measured value was calculated as a seal strength per a width of 15 mm to obtain an initial seal strength.

(4) Electrolytic Solution-Resisting Seal Strength:

The above-prepared laminate making a packaging body was cut to prepare two laminate test samples of 60×75 mm. The two laminate samples were superimposed such that the sealant film surfaces thereof were faced each other, and the above-prepared adhesive sheet-provided aluminum terminal sample was inserted into the edge with a length of 60 mm. The edge into which the adhesive sheet-provided aluminum terminal sample had been inserted, the both opposing edges and the edge opposing to the edge into which the adhesive sheet-provided aluminum terminal sample had been inserted were each sealed by a hot plate (sealing condition: 190° C., 1.0 MPa, 3 seconds), thereby forming a thermal-adhesive part with a width of 7 mm in the edge into which the adhesive sheet-provided metal terminal sample had been inserted and the edge opposing thereto and also forming a thermal-adhesive part with a width of 10 mm in the both opposing edges orthogonal to the edge into which the adhesive sheet-provided metal terminal sample had been inserted. There was thus prepared a packaging bag having sealed four edges. 1 g of an electrolytic solution (prepared by dissolving lithium hexafluorophosphate in a mixed solution (ethylene carbonate/diethyl carbonate/dimethyl carbonate =1/1/1 (volume ratio)) to make one mole/liter of a lithium hexafluorophosphate solution) was sealed in this packaging bag. The packaging bag was then stored in a thermo-hygrostat at 60° C. and 90% RH for 7 days such that the thermal-adhesive part of the edge into which the adhesive sheet-provided metal terminal sample had been inserted was located downward. Thereafter, the packaging bag was taken out and cut along the aluminum terminal, thereby preparing a sample for measuring an electrolytic solution-resisting seal strength having a width of 4 mm and a length of 30 mm, in which the adhesive sheet and the laminate were integrated on the both surfaces of the aluminum foil. The respective laminates on the both surfaces of the metal terminal of this sample for measuring an electrolytic solution-resisting seal strength were fixed by a tool and measured for a seal strength at a tensile rate of 300 mm/min by an autograph. At that time, an average strength thereof was defined as a measured value. The obtained measured value was calculated as a seal strength per a width of 15 mm to obtain an electrolytic solution-resisting seal strength.

(5) Insulation Properties:

The above-prepared laminate making a packaging body and the adhesive sheet were each cut to prepare a 60 mm-square test sample. The laminates were disposed such that the sealant film surfaces thereof were faced each other; a nickel foil (metal terminal) having a width of 4 mm, a length of 80 mm and a thickness of 100 μm was inserted between the laminates in a state that it was interposed between the two adhesive sheets; terminals of a tester were connected to the nickel foil and the aluminum foil of the laminate; and sealing (sealing condition: 190° C., 1.0 MPa, 3 seconds) was achieved in this state in an orthogonal direction to the length direction of the nickel foil by a hot plate with a width of 7 mm. The sample was measured for a time required until the nickel foil and the aluminum foil of the laminate caused a short circuit. As a result, the case where the time is 120 seconds or more is judged to be "excellent" in insulation properties; the case where the time is 15 seconds or more and less than 120 seconds is judged to be "good" in insulation properties; the case where the time is 8 seconds or more and less than 15 seconds is judged to be "acceptable" in insulation properties; and the case where the time is less than 8 seconds is judged to be "poor" in insulation properties, respectively.

(6) Water Vapor Barrier Properties:

The above-prepared laminate making a packaging body was cut to prepare a laminate test sample of 100×120 mm; and the adhesive sheet was cut to prepare an adhesive sheet test sample of 15×120 mm. The laminate test sample was folded in half such that the sealant film surfaces thereof were faced each other; and the two adhesive sheet test samples were superposed and inserted into the edge with a length of 120 mm. Thereafter, the both opposing edges and the edge into which the adhesive sheet test sample had been inserted were each sealed by a hot plate (sealing condition: 190° C., 1.0 MPa, 3 seconds), thereby forming a thermal-adhesive part with a width of 10 mm in the both opposing edges and also forming a thermal-adhesive part with a width of 7 mm in the edge into which the adhesive sheet test sample had been inserted. There was thus prepared a packaging bag having sealed three edges. 3 g of a mixed solution (ethylene carbonate/diethyl carbonate/dimethyl carbonate=1/1/1 (volume ratio)) was sealed in this packaging bag. Thereafter, the packaging bag in which the thermal-adhesive part with a width of 7 mm was trimmed in a width of 3 mm was stored in a thermo-hygrostat at 60° C. and 90% RH for 7 days and measured for an increase amount of moisture of the mixed solution. As a result, the case where the increase amount of moisture is less than 100 ppm is judged to be "excellent" in water vapor barrier properties; the case where the increase amount of moisture is 100 ppm or more and less than 140 ppm is judged to be "good" in water vapor barrier properties; and the case where the increase amount of moisture is 140 ppm or more and less than 200 ppm is judged to be "acceptable" with respect to water vapor barrier properties, respectively.

(7) Resistance to Heat Shrinkage:

The above-prepared laminate making a packaging body and the adhesive sheet were each cut to prepare a 60 mm-square test sample. The laminates were disposed such that the sealant film surfaces thereof were faced each other; a nickel foil (metal terminal) having a width of 4 mm, a length of 80 mm and a thickness of 100 μm was inserted between the laminates such that the adhesive sheet was protruded by 2 mm from the laminate in a state that it was interposed between the two adhesive sheets; and sealing (sealing condition: 190° C., 1.0 MPa, 3 seconds) was achieved in this state in an orthogonal direction to the length direction of the nickel foil by a hot plate with a width of 7 mm. Undulation of the protruded portion of the adhesive sheet was visually evaluated; and a degree of shrinkage of the seal part where the metal terminals were held into the other seal part of the adhesive sheet was evaluated. As a result, the case where undulation of the adhesive sheet is not observed and the heat shrinkage is less than 1 mm is judged to be "good" in resistance to heat shrinkage; the case where undulation of the adhesive sheet is observed and the heat shrinkage is 1 mm or more is judged to be "poor" in resistance to heat shrinkage; and the case where though undulation of the adhesive sheet is observed, the heat shrinkage is less than 1 mm is judged to be "acceptable" with respect to resistance to heat shrinkage, respectively.

(8) Presence or Absence of Leakage:

The above-prepared laminate making a packaging body was cut to prepare a laminate test sample of 60×160 mm; and the adhesive sheet was cut to prepare an adhesive sheet test sample of 15×60 mm. The laminate test sample was folded in half such that the sealant film surfaces thereof were faced each other; a nickel foil (metal terminal) having been subjected to a washing treatment with nitric acid and having a width of 4 mm, a length of 20 mm and a thickness of 100 μm and an aluminum foil (metal terminal) having been subjected to a phosphoric acid-chromate treatment and having the same size were interposed and inserted in parallel between the two adhesive sheets in a state that they did not come into contact with each other in the edge with a length of 60 mm; and the three edges were sealed by a hot plate (sealing condition: 190° C., 1.0 MPa, 3 seconds), thereby preparing a packaging bag having sealed three edges and having a thermal-adhesive part with a width of 7 mm. 3 g of an electrolytic solution (prepared by dissolving lithium hexafluorophosphate in a mixed solution (ethylene carbonate/diethyl carbonate/dimethyl carbonate=1/1/1 (volume ratio)) to make one mole/liter of a lithium hexafluorophosphate solution) was sealed in this packaging bag. The packaging bag was then stored in a thermostat at 60° C. for 7 days, and the presence or absence of leakage of the electrolytic solution from the metal terminal and the adhesive sheet was visually evaluated.

TABLE 1

| | Laminate strength (N/15 mm) | | Seal strength (N/15 mm) | | | Water vapor | Resistance | Presence or |
| | Initial stage | Resistance to electrolytic solution | Initial stage | Resistance to electrolytic solution | Insulation properties | barrier properties | to heat shrinkage | absence of leakage |
|---|---|---|---|---|---|---|---|---|
| Example 1 | Failure in separation | Failure in separation | 54 | 47 | Good | Excellent | Good | No |
| Example 2 | Failure in separation | Failure in separation | 50 | 45 | Excellent | Excellent | Good | No |
| Example 3 | Failure in separation | Failure in separation | 46 | 40 | Excellent | Excellent | Good | No |
| Example 4 | Failure in separation | Failure in separation | 51 | 44 | Good | Good | Good | No |
| Example 5 | Failure in separation | Failure in separation | 55 | 45 | Excellent | Excellent | Good | No |
| Comparative Example 1 | 7.0 | 4.5 | 38 | 28 | Excellent | Acceptable | Good | No |
| Comparative Example 2 | — | — | 58 | 50 | poor | Excellent | poor | No |

As is clear from Table 1, the adhesive sheets of Examples 1 to 5 and Comparative Example 1 exhibited an excellent performance in the initial laminate strength. However, in the laminate strength after dipping in the electrolytic solution (electrolytic solution-resisting laminate strength), a reduction of the laminate strength was observed in Comparative Example 1, whereas a reduction of the laminate strength was not observed in Examples 1 to 5. On the other hand, the adhesive sheets of Examples 1 to 5 and Comparative Example 2 exhibited a high seal strength in both the initial seal strength and the seal strength after sealing the electrolytic solution (electrolytic solution-resisting seal strength). In contrast, the adhesive sheet of Comparative Example 1 revealed the results that the initial seal strength is low and that the seal strength after dipping in the electrolytic solution (electrolytic solution-resisting seal strength) was further lowered. Also, with respect to the insulation properties, Examples 2, 3 and 5 and Comparative Example 1 were the most excellent; and Example 1 and 4 followed. Comparative Example 2 did not bring an insulation effect in the practical use. With respect to the water vapor barrier properties, Examples 1 to 5 and Comparative Example 2 exhibited good results, whereas Comparative Example 1 exhibited explicitly inferior results. With respect to the resistance to heat shrinkage, Examples 1 to 5 and Comparative Example 1 exhibited an excellent performance, whereas Comparative Example 2 exhibited explicitly inferior results.

It is noted from the foregoing that the adhesive sheets of Examples 1 to 5 are high in both the laminate strength and the seal strength, free from a reduction of the layer-to-layer strength (laminate strength) before and after dipping in the electrolytic solution, free from a reduction of the seal strength in the thermal-adhesive part interposing the metal terminal after sealing and storing the electrolytic solution and very excellent in the sealing properties. The resistance to heat shrinkage as referred to herein is related to undulation or heat shrinkage of the adhesive sheet. In general, the adhesive sheet is thermally adhered in a state that it is protruded by about 2 mm from the edge of the packaging body. In the case of use in a state that the metal terminals are held into the packaging body edge of a lithium battery, when undulation or heat shrinkage is generated on the adhesive sheet, there is a possibility that the barrier layer composed of an exposed metal foil and the metal terminal come into contact with each other to cause a short circuit on an edge surface of the packaging body. The resistance to heat shrinkage exhibits a performance for preventing this from occurring.

LIST OF REFERENCE NUMERALS

Patent Document 1: JP-A-2000-208112

What is claimed is:

1. An adhesive sheet for sealing metal terminals of a flat electrochemical cell,
the flat electrochemical cell including
a packaging material provided with, at least,
an inner layer formed of a polyolefin based thermal-adhesive resin and
a barrier layer formed of a metal foil,
an electrochemical device provided with a positive electrode and a negative electrode, and
metal terminals connected to the positive electrode and the negative electrode, respectively,
the electrochemical device being enclosed in the packaging material and sealed therein by the thermal-adhesive resin at edges of the packaging material,
the metal terminals being held between edges of the packaging material, with unconnected ends of the metal terminals protruding outside,
the adhesive sheet being interposed between the inner layer and the metal terminals where the metal terminals protrude out through the packaging material,
wherein
the adhesive sheet is a fibrous sheet or a porous sheet coated on both sides with an acid-modified polyolefin based resin layer adhesive to the inner layer and the metal terminals.

2. The adhesive sheet for sealing metal terminals of a flat electrochemical cell according to claim 1, wherein
the fibrous sheet is a natural fiber or a chemical fiber made of a synthetic resin having a melting point of 200° C. or higher.

3. The adhesive sheet for sealing metal terminals of a flat electrochemical cell according to claim 2, wherein the fibrous sheet is composed mainly of a wholly aromatic polyester based fiber.

4. The adhesive sheet for sealing metal terminals of a flat electrochemical cell according to claim 3, wherein the wholly aromatic polyester based fiber is a melt-anisotropic wholly aromatic polyester fiber.

5. The adhesive sheet for sealing metal terminals of a flat electrochemical cell according to claim 3, wherein the fibrous sheet composed of the wholly aromatic polyester based fiber has a moisture absorption rate of not more than 0.1% under an environment at 25° C. and 65% RH.

6. The adhesive sheet for sealing metal terminals of a flat electrochemical cell according to claim 4, wherein the fibrous sheet composed of the wholly aromatic polyester based fiber has a moisture absorption rate of not more than 0.1% under an environment at 25° C. and 65% RH.

7. The adhesive sheet for sealing metal terminals of a flat electrochemical cell according to claim 1, wherein the porous sheet is composed of a synthetic resin having a melting point of 200° C. or higher.

8. The adhesive sheet for sealing metal terminals of a flat electrochemical cell according to claim 1, wherein the polyolefin based resin which forms the inner layer is composed of polypropylene, and the acid-modified polyolefin based resin is a polypropylene graft-modified with an unsaturated carboxylic acid.

9. The adhesive sheet for sealing metal terminals of a flat electrochemical cell according to claim 1, wherein the fibrous sheet has a basis weight of from 5 to 25 g/m$^2$ and a density of from 0.15 to 0.45 g/cm$^3$.

10. An adhesive sheet, comprising
a fibrous sheet or a porous sheet,
wherein
one surface of the fibrous sheet or the porous sheet is coated with an inner surface of a first acid-modified polyolefin based resin layer,
another surface of the fibrous sheet or the porous sheet is coated with an inner surface of a second acid-modified polyolefin based resin layer,
an outer surface of the first acid-modified polyolefin based resin layer is exposed and is on an opposite side of the first acid-modified polyolefin based resin layer from the inner surface thereof, and
an outer surface of the second acid-modified polyolefin based resin layer is exposed and is on an opposite side of the second acid-modified polyolefin based resin layer from the inner surface thereof.

11. The adhesive sheet according to claim 10, wherein the fibrous sheet is a natural fiber or a chemical fiber made of a synthetic resin having a melting point of 200° C. or higher.

12. The adhesive sheet according to claim 11, wherein the fibrous sheet is composed mainly of a wholly aromatic polyester based fiber.

13. The adhesive sheet according to claim 12, wherein the wholly aromatic polyester based fiber is a melt-anisotropic wholly aromatic polyester fiber.

14. The adhesive sheet according to claim 12, wherein the fibrous sheet composed of the wholly aromatic polyester based fiber has a moisture absorption rate of not more than 0.1% under an environment at 25° C. and 65% RH.

15. The adhesive sheet according to claim 13, wherein the fibrous sheet composed of the wholly aromatic polyester based fiber has a moisture absorption rate of not more than 0.1% under an environment at 25° C. and 65% RH.

16. The adhesive sheet according to claim 10, wherein the porous sheet is composed of a synthetic resin having a melting point of 200° C. or higher.

17. The adhesive sheet according to claim 10, wherein the acid-modified polyolefin based resin is a polypropylene graft-modified with an unsaturated carboxylic acid.

18. The adhesive sheet according to claim 10, wherein the fibrous sheet has a basis weight of from 5 to 25 g/m$^2$ and a density of from 0.15 to 0.45 g/cm$^3$.

19. The adhesive sheet according to claim 10, wherein the acid-modified polyolefin based resin is adhesive to a general polyolefin based resin and to a metal terminal.

* * * * *